Patented Nov. 15, 1949

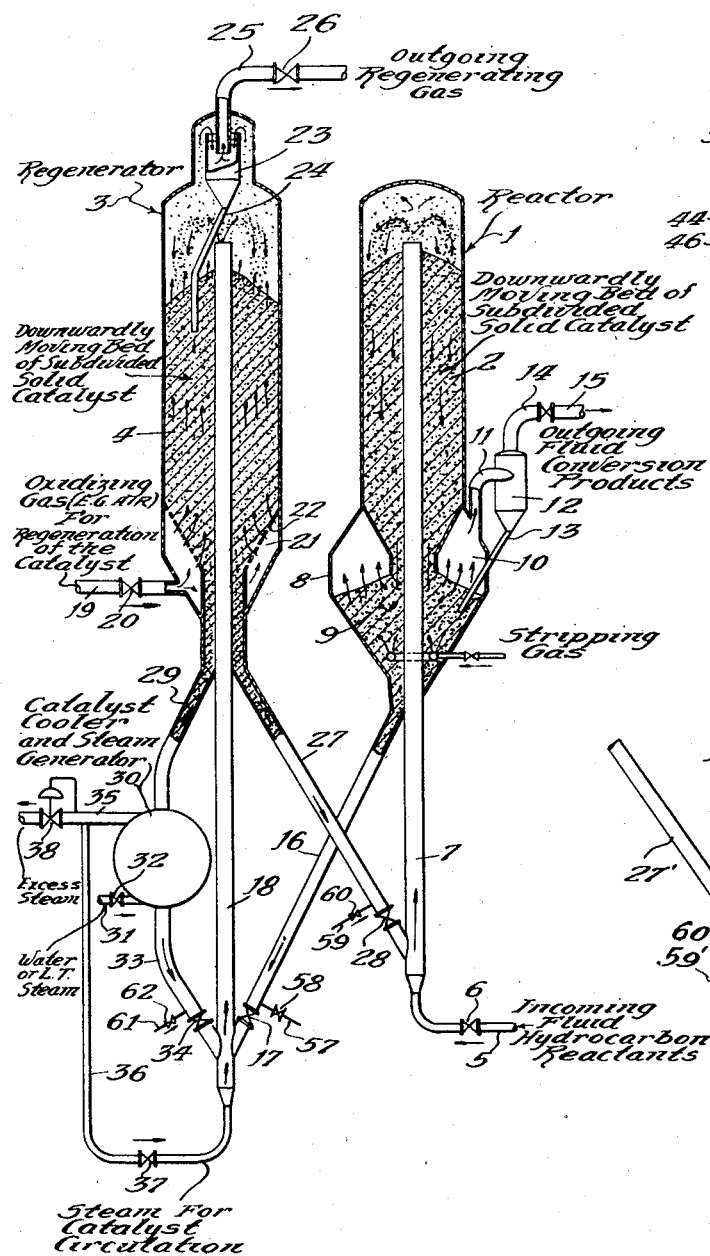

2,487,961

UNITED STATES PATENT OFFICE 2,487,961

CATALYTIC CONVERSION OF FLUID REACTANTS

Charles H. Angell, Chicago, Ill., assignor to Universal Oil Products Company, Chicago, Ill., a corporation of Delaware Application December 31, 1943, Serial No. 516,582

4 Claims. (Cl. 23—1)

The invention is directed to an improved process and apparatus for the conversion of fluid reactants in the presence of a mass of subdivided solid contact material or catalyst upon which deleterious combustible products of the conversion reaction are deposited and which is regenerated by burning combustibles therefrom.

The process is of the general type employing separate confined reaction and regenerating zones, each containing a bed of the subdivided solid catalyst or contact material and through which the catalyst or contact material is continuously circulated in series so that the conversion reaction being conducted in the one zone and the regenerating operation being conducted in the other zone are accomplished continuously and simultaneously.

One of the problems attending operations of the general type above outlined is that of providing a method and means for effecting circulation of the subdivided solid material between and through the confined reaction and regenerating zones. In the so-called "fluid bed" type of catalytic cracking operation, which is of this general class, the beds of catalyst in the separate confined zones are each maintained in a turbulent fluid-like condition resembling that of a boiling liquid and catalyst continuously withdrawn from the bed in the reaction zone is suspended in a stream of incoming air employed for effecting its regeneration and transported by said air stream into the regenerating zone. At the same time catalyst continuously withdrawn from the regenerating zone is suspended in a stream of incoming vaporous hydrocarbon reactants to be converted and is transported by the latter into the reaction zone to complete the circuit. Various modifications of this scheme for effecting circulation of the catalyst have been proposed but they all depend to a greater or lesser degree upon maintaining turbulence and fluidity within the beds.

Another operation of the general class above mentioned employs relatively compact beds through which the catalyst particles move downwardly in the reaction and regenerating zones. In these compact bed operations, it is the general practice to employ mechanical elevators or conveyors for transporting the catalyst from the lower portion of one zone to the upper portion of the other. This is costly in comparison with the aforementioned method for transporting catalyst which is employed in the fluid-bed type of operation and practical considerations limit the rate of catalyst circulation which can be effected in this manner, thereby reducing the flexibility of the operation by limiting one of the important operating variables.

While the fluid bed type of operation has pronounced advantages over the compact moving-bed type of operation with respect to flexibility, the facility with which catalyst circulation is effected and also in certain other respects which will be later mentioned, it has some inherent disadvantages which are not common to the compact moving-bed operation. The turbulent fluid-like condition of the beds gives thorough mixing of the catalyst particles therein with the result that there is no uniformity of residence time for the individual catalyst particles within either the reaction zone or the regenerating zone. As a consequence of this, some of the catalyst passes through the regenerating zone in a very short time and leaves the same with a deposit of contaminants closely approaching that which it had upon entering the regenerator. On the other hand, part of the catalyst passes through the reaction zone in such a short time that its activity is not fully utilized while another portion remains in the reaction zone for a considerable time after its activity is depleted.

Another important problem in operations of the general class above-mentioned is that of controlling or limiting the temperature encountered in the exothermic regenerating step where heat is developed by combustion of the contaminating deposits on the catalyst. The activity of catalysts commonly employed in operations of this type is permanently impaired when they are subjected to excessively high temperature. For example, the best synthetic cracking catalysts, such as those comprising a composite of silica with one or more metal oxides such as alumina, zirconia, magnesia and the like, can not safely be subjected to a temperature in excess of 1200 to 1300° F. or thereabouts. Many other commonly used catalysts such as, for example, natural or treated clays are damaged at a considerably lower temperature.

In the fluid bed operation, turbulence and mixing within the bed gives a substantially uniform distribution of heat throughout the same and temperature control is readily achieved by the local circulation of catalyst to and from the bed in the regenerator through an external cooler or heat exchanger. It is common practice to withdraw a stream or column of catalyst from the upper portion of the bed, suspend it in a stream of incoming air employed for regeneration and pass the suspension back into the bed in the regenerator through the cooler.

In the compact moving-bed operation, the absence of turbulence and mixing of the catalyst particles undergoing regeneration obviates uniform heat distribution throughout the bed in the regenerator and it has heretofore been considered necessary to employ a regenerating vessel of the heat exchange type providing a large area of heat exchange surface (such as a multiplicity of closely spaced tubes) well distributed throughout the bed. Cooling fluid is passed through the tubular heat exchange elements or the like for the purpose of abstracting excess heat from the bed and substantially equalizing the temperature therein so as to prevent the development of hot spots or localized zones of excessively high temperature therein.

It is the purpose of the present invention to provide a process and apparatus of the general class above mentioned, which employs a compact moving bed in the regenerating zone and in which the aforementioned disadvantages of both the compact moving bed and the fluid bed types of operation are obviated. In this improved process and apparatus the catalyst or the contact material is transported between the reaction and regenerating zones without the use of mechanical elevators or conveyors and adequate control of temperature is obtained in the regenerating zone without resorting to the use of a heat exchange type regenerating vessel.

Another and further object of the invention is to provide a process and apparatus, utilizing either a fluid-like or a relatively compact bed of subdivided solid contact material or catalyst in the reaction zone and utilizing either form of bed in a concomitantly operated regenerating zone, wherein transportation of the subdivided solid particles from the reaction zone to the regenerating zone and/or from the regenerating zone to the reaction zone is effected by the gas lift action of steam which is generated and/or superheated by indirect contact between H₂O and hot regenerated solid particles withdrawn from the regenerating zone. Generating and/or superheating steam in this manner not only serves to convert available excess heat from the regenerating step to a form of energy which is useful in transporting the solid particles, but also serves to materially reduce the temperature of regenerated solid particles before they are contacted with the steam utilized for their transportation.

The last mentioned feature is of particular importance because of the fact that steam is damaging to many of the solid contact materials commonly employed when it is contacted with the latter at the temperatures ordinarily utilized in the regenerating step. At a lower temperature the action of steam on the catalyst or contact material is not particularly detrimental and it may be safely used to effect transportation of the solid particles when, as provided by the invention, they are first cooled sufficiently. A very convenient and economical way of accomplishing their cooling is in the manner provided by the invention, namely by indirect contact and heat exchange with water or low temperature steam which is subsequently employed as the transporting medium.

In the accompanying diagrammatic drawing Fig. 1 is an elevational view, shown principally in section of one specific form of apparatus embodying the features of the invention and in which the improved process of the invention may be conducted.

Fig. 2 of the drawing is an elevational view, shown principally in section of a modified form or reaction vessel which may be employed in conducting the process of the invention.

Referring to Fig. 1 of the drawing, the apparatus here illustrated comprises a reaction vessel 1, in which the conversion of fluid reactants is accomplished in the presence of a downwardly-moving relatively compact bed 2 of subdivided solid catalyst or contact material, and a regenerating vessel 3, in which subdivided solid catalyst or contact material supplied thereto from the reactor moves downwardly through bed 4 and is regenerated by the burning of combustible contaminants therefrom in a stream of oxidizing gas.

A stream of fluid reactants to be converted, such as hydrocarbons to be cracked, for example, is supplied in either vaporous or liquid state or in a mixed phase condition through line 5 and valve 6 to a substantially vertical conduit 7 wherein it meets and commingles with a stream of relatively hot regenerated solid particles supplied to conduit 7 from the regenerator as will be later described. In case the reactants are supplied to conduit 7 in liquid state, they will be vaporized by contact with hot regenerated solid particles and the gas-lift action of the vapors transports the solid particles upwardly through conduit 7. The commingled catalyst particles and vapors are discharged from the open upper end of conduit 7 into the upper portion of reactor 1 and the catalyst particles fall into the bed 2 maintained in the reactor and travel downwardly through the bed into the enlarged lower section 8 of the reaction vessel.

The vaporous reactants also pass downwardly from the upper portion of the reactor through the bed 2 in contact with the solid particles of the bed and are directed with the latter into the lower portion 8 of the reactor wherein the resulting vaporous and gaseous conversion products are disengaged from the mass 9 of solid particles retained in the lower portion of zone 8. The vapors and gases are directed with any small amount of solid particles which remain entrained therein from space 10 provided above mass 9 in zone 8 through line 11 to suitable separating equipment for the solid particles such as, for example, the centrifugal or cyclone type separator indicated at 12. Separated solid particles are returned from the lower portion of separator 12 through line 13 to the mass 9 in the lower portion of the reactor. Vaporous and gaseous conversion products substantially free of entrained solid particles are directed from the upper portion of separator 12 through line 14 and pressure control valve 15 to fractionating and recovery equipment of any suitable conventional form not pertinent to the invention and therefore not illustrated.

A stream of solid particles which have become contaminated in reactor 1 by the deposition thereon of deleterious heavy combustible conversion products is continuously directed from the mass 9 in the lower portion of the reactor downwardly through line 16 and the adjustable orifice or flow control valve 17 provided adjacent its lower end into a substantially vertical conduit 18 which terminates in the upper portion of regenerator 3. In conduit 18 the contaminated solid particles from line 16 are commingled with steam derived and supplied to conduit 18 as will be hereinafter described and are transported by the gas-lift action of the steam upwardly through conduit 18 to be discharged from the open upper end thereof into the upper portion of regenerator 3. The steam utilized passes out of the regenerator as will be later described while solid particles fall by gravity, due to reduced velocity of the steam in the upper portion of the regenerator, into the bed 4 through which they move downwardly countercurrent to a stream of oxidizing gas which is passed upwardly through the bed to contact the solid particles and burn combustibles therefrom.

The oxidizing gas employed may comprise air or air diluted with non-oxidizing gas such as $CO_2$, combustion gases or the like. It is supplied to the lower portion of the regenerator through line 19 and valve 20. The oxidizing gas passes from the space 21 provided in the lower portion of the regenerator through a suitable screen or perforate partition 22, preferably of inverted substantially conical form, into the bed 4 and upwardly therethrough with resulting combustion gases generated by the burning of combustibles from the bed. The resulting gaseous products of regeneration are directed with the steam supplied through conduit 18 and with the relatively small amount of entrained solid particles from the space provided above bed 4 within the upper portion of the regenerator to suitable separating equipment for the solid particles, such as a centrifugal or cyclone type separator indicated at 23. Separated solid particles are directed from lower portion of separator 23 through line 24 into the bed 4 and the gases from which they have been separated are discharged from the upper portion of the separator through line 25 and pressure control valve 26 preferably to suitable heat recovery and steam condensing equipment such as, for example, a waste heat boiler, hot gas turbine or the like not illustrated.

A stream of hot regenerated solid particles is continuously directed from bed 4 and from the lower portion of the regenerator downwardly through line 27 and the adjustable orifice or flow control valve provided adjacent its lower end into conduit 7, wherein the solid particles meet the incoming stream of fluid reactants and are supplied therewith to the upper portion of the reactor as previously described.

Another line 29 leads from bed 4 and from the lower portion of the regenerator downwardly into cooler 30 which comprises a steam generator or superheater through which hot subdivided solid contact material withdrawn from the bed in the regenerator is passed in indirect contact and heat exchange relation with water or relatively low temperature steam supplied through line 31 in valve 32. The contact material is thereby cooled to a temperature appreciably lower than that prevailing in the lower portion of bed 4 and is directed from cooler 30 through line 33 and the adjustable orifice or flow control valve 34 provided adjacent the lower end of line 33 into conduit 18, through which it is transported with the contaminated catalyst from line 16 into the upper portion of the regenerator to materially reduce the temperature which would otherwise prevail in the zone.

Steam which is generated or superheated in cooler 30 by heat exchange with the hot regenerated catalyst passing therethrough, is discharged through line 35 and is directed all or in part through line 36 and valve 37 into the lower portion of conduit 18 wherein it serves as the transporting fluid for the solid particles supplied to conduit 18 as previously described through lines 16 and 33.

In most instances the heat to be extracted from the solid particles in cooler 30 will be sufficient to generate and/or super-heat more steam than that required to transport the cooled solid particles back into the generator and to transport the contaminated solid particles from the reactor to the regenerator as previously described. The quantity of water or low temperature steam supplied to cooler 30 is regulated to reduce the temperature of the solid particles passing through this zone to the desired value and steam generated or superheated in zone 30 in excess of that required for use as transporting fluid is discharged through valve 38 in line 35. In the case illustrated valve 38 is an automatic pressure control valve opened and closed in response to minor variations in pressure existing on its upstream side, so as to maintain the latter substantially constant.

In some types of operation contemplated by the invention, such as, for example, in the catalytic dehydrogenation of normal gaseous hydrocarbons, the quantity of combustible contaminants accumulated by the solid particles in the reaction step is relatively low and the heat to be abstracted in cooler 30 may not be sufficient to give the desired quantity of steam from cooler 30 for use in the manner described as the transporting fluid. In such instances it is entirely within the scope of the invention to employ additional steam from another source such as, for example, that produced in a steam generator, not illustrated, to which outgoing hot combustion gases from the regenerator are supplied, as previously mentioned.

To substantially strip the column of solid particles passing through conduit 27 of oxidizing gas and gaseous products of combustion, steam or other relatively inert gas is supplied to conduit 27 on the upstream side of valve 28 through line 57 and valve 58. Similarly steam or other suitable relatively inert gas is supplied to conduit 16 on the upstream side of valve 17 through line 59 and valve 60 to substantially strip the column of solid particles passing through conduit 7 of occluded reactants and conversion products. Since the solid particles passing through cooler 30 are returnd to the regenerator it is not necessary to strip this column of oxidizing gas and combustion gases. However, to prevent excessive compaction of the solid particles in conduit 29, cooler 30 and conduit 33, which would hinder their flow, steam or other relatively inert gas is preferably supplied to conduit 33 on the upstream side of valve 34 through line 61 and valve 62. The stripping fluid supplied through lines 57 and 59 to the respective conduits 16 and 27 also serves to prevent excessive compaction of the solid particles in these conduits.

By returning cooled catalyst or contact material from cooler 30 to the upper portion of the bed in the regenerator, as provided by the invention, the temperature of the bed is controlled and kept within safe limits. For example, assuming that it is desirable to limit the temperature encountered by the contact material during its regeneration to approximately 1100° F., the stream of contact material being recycled through the regenerator and cooler 30 may be withdrawn at approximately 1100° F. from the lower portion of bed 4 and passed through cooler 30 in indirect contact and heat exchange with a sufficient quantity of water or low temperature steam to reduce the temperature of the contact material to within the range of, say, 800 to 1000° F. and yield steam at approximately the same temperature. The cooled solid particles and steam are then commingled and supplied to the upper portion of the regenerator in quantities regulated to maintain the temperature in the upper portion of the bed at a predetermined value which may be from 50 to 200° F. or thereabouts lower than the maximum temperature which it is desired to maintain in the lower portion of the bed. Thus, with a maximum temperature of 1100° F. in the lower portion of the bed, the temperature will be in order of 900 to 1050° F. in the upper portion of the bed and will gradually increase to the maximum mentioned in successive lower portions of the bed, as the solid particles pass downwardly therethrough. The rate of circulation of the solid particles through the bed is correlated with the temperature to which the recycled particles are cooled to give the desired temperature drop across the bed and prevent the maximum temperature therein from reaching the value which would cause damage to the solid particles.

Preferably, the inventory of solid particles or volume of the bed in regenerating zone is sufficient, and the proportions of the beds are such that oxidizing gas may be passed through the bed at a rate which will effect regeneration or burning of the combustibles to the degree of completion desired in a single pass for the solid particles through the bed in regenerator. With this provision, the recycled solid particles are substantially devoid of combustible contaminants and serve to dilute the contaminated solid particles being supplied to the regenerator from a reactor as well as to cool the mass of solid particles undergoing regeneration.

The provisions of the invention for obtaining countercurrent flow between the solid particles of the bed in the regenerator and the oxidizing gas employed for effecting their regeneration materially assist in preventing the development of excessively high temperature at any point in the bed. With the general countercurrent flow provided, the incoming oxidizing gas stream, rich in free oxygen, first contacts the solid particles from which substantially all or a major portion of the combustibles have been previously burned at a higher region in the bed, while the outgoing gases, which are lowest in free oxygen content, contact the incoming solid particles which contain the greatest quantity of combustibles. This tends to equalize temperatures within the bed and prevent the development of hot spots or localized zones of excessively high temperature therein.

The invention also contemplates an operation in which steam, rather than the incoming fluid reactants to be converted, is utilized to effect the transfer of hot regenerator catalyst or contact material from the regenerating zone to the reacting zone, in order that a general countercurrent flow may be employed in the latter between the fluid reactants and the contact material. Fig. 2 illustrates a modified form of reactor which may be substituted for that illustrated in Fig. 1 when countercurrent flow is desired in the reactor.

Referring now to Fig. 2, the conduits or transfer lines 7', 16', and 27' correspond respectively to the conduits 7, 16, and 27 of Fig. 1. The stream of hot subdivided particles from the regenerator, which is not illustrated in Fig. 2 passes through line 27' and an adjustable orifice or flow control valve 28' into conduit 7' wherein the solid particles are commingled with steam supplied through line 40 and valve 41 from a catalyst cooler such as indicated at 30 in Fig. 1, for example, or from any other convenient source. The gas-lift action of the steam transports the solid particles upwardly through conduit 7' into the upper portion 42 of the reaction vessel 43. In zone 42 of the reactor the decreased velocity of the steam causes settling of the solid particles to effect separation of a major portion of the latter from the steam. The separated solid particles pass downwardly through a plurality of standpipes or an annular space indicated on 44 into the bed 45 maintained within the reactor beneath the partitioning member 46. The solid particles pass downwardly through the bed 45 to conduit 16' to be directed downwardly through the latter and thence upwardly into the regenerator in the manner previously described in the conjunction with Fig. 1.

Fluid reactants to be converted are supplied to the lower portion of reactor 43 through line 47 and valve 48, entering the reactor beneath the perforate substantially conical distributing member 49, above which the bed 45 is retained and through which the incoming fluid reactants pass into contact with the bed. Conversion of fluid reactants is accomplished as they pass upwardly through bed 45 in contact with descending solid particles of the bed and resulting fluid conversion products pass from the upper portion of the bed into the space 50 provided between the upper portion of bed 45 and the partitioning member 46.

The fluid conversion products discharged from bed 45 into space 50 of the reactor may contain a small amount of suspended or entrained solid particles and in such instances the mixture is directed through line 51 to suitable separating equipment for the solid particles such as the cyclone or centrifugal type separator indicated at 52. Steam from the upper portion 42 of the reaction vessel above partition 46 is also supplied, in the case illustrated, to separator 52 through line 53 together with entrained or suspended solid particles. Separated solid particles are returned from the lower portion of separator 52 through standpipe 54 to bed 45 in the reactor. Fluid conversion products and steam are directed from the upper portion of separator 52 through line 55 and valve 56, preferably to fractionating, condensing, and recovery equipment of any suitable conventional form not illustrated.

It is within the scope of the invention to employ a regenerating vessel of substantially the same form as the reactor 43 of Fig. 2, either in conjunction with a reactor of this same form, or in conjunction with a reactor of the general type illustrated in Fig. 1. With a regenerating vessel similar to reactor 43 of Fig. 2, the same provisions as illustrated and described in conjunction with Fig. 1 are made for controlling the regenerating temperature by the cooling and recirculation of solid particles through the bed in the regenerator. The essential distinction is that, with a regenerator of the same general form as the reactor shown in Fig. 2, contact between the steam employed for effecting circulation of the cooled contact material and the bed of solid particles undergoing regeneration is minimized, since the steam separating zone corresponding to zone 42 of the apparatus illustrated in Fig. 2 is separate from the lower portion of the vessel beneath partition 46 where the burning reaction occurs and where hot combustion gases are separated from the bed.

Although the invention is partially directed to that type of operation in which the beds of subdivided solid catalyst or contact material in the reaction and regenerating zones are maintained in a relatively compact condition, the features of the invention with respect to the control of temperature in regenerating step, the method of effecting recirculation of solid particles in the regenerator, and the method of transporting solid particles from the regenerator to the reactor and from the reactor to the regenerator will be found advantageous as applied to operations of the type in which the bed in the reactor, or the bed in the regenerator, or both, are maintained in a relatively dense fluid-like condition.

The invention therefore contemplates operation of the fluid bed type and particularly such operations in which an approach to concurrent flow between the solid particles of the fluid-like bed and the fluid reactants or regenerating gas, as the case may be, is obtained in the reaction zone and/or in the regenerating zone by supplying the solid contact material to the upper portion of these respective zones and supplying the fluid reactants or the regenerating gas, as the case may be, upwardly into the bed at a velocity which keeps the bed in a relatively dense fluid-like condition. This type of operation may be accomplished by employing, for example, a reaction vessel or a regenerating vessel, or both, of the same general type as illustrated in Fig. 2 and controlling the rate at which the fluid reactants are supplied to the reactor or the rate at which oxidizing gas is supplied to the regenerator to give an upward gas velocity in the bed which partially counteracts the force of gravity on the solid particles and brings about their hindered settling and resulting fluidization of the bed.

I claim as my invention:

1. A process for the conversion of fluid reactants which comprises maintaining a relatively dense mass of subdivided solid contact material in a confined reaction zone, passing said fluid reactants in contact therewith and therein effecting the conversion reaction, with the resulting deposition of combustible contaminants on the solid particles, maintaining a relatively dense mass of contaminated solid particles in a combustion zone and burning combustible contaminants therefrom by contacting the same with hot oxidizing gas, returning a stream of solid particles from which contaminants have been burned from said mass in the combustion zone to said mass in the reaction zone, removing another stream of solid particles from the mass in the combustion zone and passing the same through a cooling zone in indirect heat exchange with H2O to materially reduce the temperature of the last named stream and obtain superheated steam, simultaneously removing contaminated solid particles from said reaction zone, suspending the last-named particles and cooled solid particles from said cooling zone in an upwardly directed stream of said superheated steam and passing the suspended particles by the gas-lift action of the steam to an elevation above said mass in the combustion zone, discharging the suspension of solid particles in steam in an upward direction into the upper portion of the combustion zone above said mass therein and there separating the suspended solid particles from the steam and supplying the same by gravity to the mass in the combustion zone.

2. A process such as defined in claim 1 wherein the transfer of solid particles from the combustion zone to the reaction zone is effected by commingling the same with a stream of the incoming reactants to be converted, passing the resulting mixture upwardly to an elevation above the upper extremity of said mass in reaction zone and thence into the upper portion of the mass, and wherein said fluid reactants and solid particles thus transferred are passed concurrently downward through the mass in reaction zone to a disengaging zone wherein solid particles are separated from the fluid reactants and wherefrom contaminated solid particles are returned, as previously described, to the combustion zone.

3. A process such as defined in claim 1 wherein the transfer of solid particles from the combustion zone to the reaction zone is effected by directing the same downwardly into contact with steam derived as aforesaid and transporting the solid particles upwardly by the gas-lift action of said steam to an elevation above the upper extremity of said mass in the reaction zone and thence by gravity into said mass.

4. A process such as defined in claim 1 wherein the transfer of solid particles from the combustion zone to the reaction zone is effected by directing the same downwardly into contact with steam derived as aforesaid and transporting the solid particles upwardly by the gas-lift action of said steam to an elevation above the upper extremity of said mass in the reaction zone and thence by gravity into said mass, and wherein fluid reactants and resulting fluid conversion products are passed upwardly through said mass in reaction zone countercurrent to the solid particles which move downwardly therethrough, resulting fluid conversion products being discharged from the upper portion of said mass and from the reaction zone.

CHARLES H. ANGELL.

REFERENCES CITED

The following references are of record in the file of this patent:

UNITED STATES PATENTS

| Number | Name | Date |
| --- | --- | --- |
| 2,256,969 | Barr | Sept. 23, 1941 |
| 2,289,329 | Prickett | July 7, 1942 |
| 2,331,433 | Simpson et al. | Oct. 12, 1943 |
| 2,337,684 | Scheineman | Dec. 28, 1943 |
| 2,395,106 | Day et al. | Feb. 19, 1946 |
| 2,407,371 | Johnig | Sept. 10, 1946 |

FOREIGN PATENTS

| Number | Country | Date |
| --- | --- | --- |
| 552,334 | Great Britain | Apr. 2, 1943 |